(12) United States Patent
Neubauer et al.

(10) Patent No.: US 11,717,998 B2
(45) Date of Patent: Aug. 8, 2023

(54) DEVICE AND METHOD FOR PRODUCING PLASTICS COMPONENTS

(71) Applicant: FTE automotive GmbH, Ebern (DE)

(72) Inventors: Sebastian Neubauer, Ebern (DE); Thomas Pohl, Ebern (DE)

(73) Assignee: FTE automotive GmbH, Ebern (DE)

( * ) Notice: Subject to any disclaimer, the term of this patent is extended or adjusted under 35 U.S.C. 154(b) by 71 days.

(21) Appl. No.: 17/123,377

(22) Filed: Dec. 16, 2020

(65) Prior Publication Data

US 2021/0187801 A1   Jun. 24, 2021

(30) Foreign Application Priority Data

Dec. 20, 2019   (DE) ..................... 10 2019 135 641.5

(51) Int. Cl.
 *B29C 45/00* (2006.01)
 *B29C 45/27* (2006.01)

(52) U.S. Cl.
 CPC ...... *B29C 45/0025* (2013.01); *B29C 45/2703* (2013.01)

(58) Field of Classification Search
 CPC .................. B29C 45/0025; B29C 45/2703
 See application file for complete search history.

(56) References Cited

U.S. PATENT DOCUMENTS 6,089,468 A   7/2000   Bouti

FOREIGN PATENT DOCUMENTS

| AT | 520389 A2 | 3/2019 | |
|---|---|---|---|
| DE | 2 306 366 | 9/1974 | |
| DE | 33 39 355 A1 | 6/1985 | |
| GB | 1421519 A   * | 1/1976 | ................ B29F 1/00 |
| WO | WO 2013/067632 A1 | 5/2013 | |

OTHER PUBLICATIONS

German Search Report dated Oct. 20, 2020 in German Application 10 2019 135 641.5 filed Dec. 20, 2019 (with English Translation of Categories or Cited Documents and Written Opinion), 8 pages.

* cited by examiner

*Primary Examiner* — James Sanders
(74) *Attorney, Agent, or Firm* — Oblon, McClelland, Maier & Neustadt, L.L.P.

(57) ABSTRACT

A device is for producing a component from a plastics material by injection moulding. The device includes two mould halves that can be pressed together releasably and, in the pressed-together state, form at least one gate region and at least one common cavity for moulding the plastics material. The gate region is fluidically connected to the cavity for the purpose of introducing the plastics material into the cavity. At least one insert part is provided which is arranged at least partially in a partial region of the gate region and is formed to prevent or at least to impede flowing of the plastics material through this partial region.

13 Claims, 3 Drawing Sheets

DEVICE AND METHOD FOR PRODUCING PLASTICS COMPONENTS

BACKGROUND

The present invention relates to a device, in particular an injection-moulding tool, for producing a component from a plastics material by means of injection moulding. The invention furthermore relates to a method for producing a component by means of injection moulding, in particular, the invention relates to a device and a method for producing cylinder housings, in. particular cylinder housings for concentric slave cylinders.

Hydraulic clutch actuating means for motor vehicles comprise a master cylinder, which can be actuated for example via a clutch pedal, and a slave cylinder, which is hydraulically connected to the master cylinder via a pressure line. The pressure created in the master cylinder by actuating the clutch pedal is transmitted via the pressure line to the slave cylinder by a pressure medium, with the result that the slave cylinder applies the actuating force to the release bearing of the friction clutch in order to separate the motor from the transmission of the motor vehicle via a release mechanism. In this respect, the slave cylinder can be in the form of an annular cylinder which is arranged around the clutch and/or transmission shaft and, for example, is fastened to the transmission housing. Such slave cylinders are also referred to as central release mechanisms or central actuators on account of their concentric arrangement with respect to the shaft.

Central release mechanisms and/or central actuators frequently have a cylinder housing which is manufactured from plastic and has at least one external cylinder wall. This cylinder wall radially outwardly delimits an annular pressure chamber in which the annular piston, which is operatively connected to the clutch, is displaceably accommodated. The cylinder housing furthermore has a pressure connector which opens out in the pressure chamber and via which the pressure medium can be admitted to the pressure chamber in order to release the clutch.

Cylinder housings of this type are usually produced in large numbers by means of injection moulding. In the process, a suitable plastic is melted in an injection unit of an injection-moulding machine and injected into the cavity of an injection-moulding tool, in which cavity the plastic resolidifies, before the injection-moulded part is removed from the mould after opening of the injection-moulding tool. The molten plastic passes out of the injection unit through a nozzle into a gate region of the injection-moulding tool and is pressed out of this region into the cavity. The cavity, i.e. the hollow space, of the injection-moulding tool determines the form and the surface structure of the finished component. In turn, the form of the gate region that is to be selected results from the form of the component to be produced.

For rotationally symmetrically formed components, such as for example cylinder housings, e.g. fan-shaped gate regions are provided, through which the plastics material can flow into the cavity uniformly over the entire periphery of said cavity. Even if the plastic distributes uniformly in the cavity when a fan gate is used, a weld line still forms in the region in which the plastics compound last converges (i.e. the flow fronts meet). This has the result that the finished component is slightly weakened in the region of the weld line, and therefore in this region the risk of leakages occurring is increased. At which point and/or in which region of the finished component the weld line occurs depends in particular on the form and surface structure of the cavity and previously were scarcely able to be influenced, at least if it is not possible or desired to change the form and structure of the component. This is disadvantageous in particular whenever the weld line is in a region of the finished component which cannot readily be strengthened, for example by increasing the wall thickness, in order to compensate the weakening owing to the weld line.

BRIEF SUMMARY

The present invention is based on the object of providing a device and a method of the type mentioned at the beginning which make it possible to change the location of the weld line in finished, in particular cylindrical injection-moulded components, without changing the form and surface structure of the cavity of the injection-moulding tool.

Said object is achieved according to the invention by a device according to Claim 1. Advantageous configurations and expedient developments of the invention become apparent from dependent claims 2 to 9.

The device according to the invention is distinguished advantageously in that at least one insert part ("insert") is provided which is arranged at least partially in a partial region of the gate region, wherein the insert part is formed in such a way that it prevents or at least impedes and/or delays flowing of the plastics material through this partial region. In this way, a situation is achieved in which the region of the cavity of the injection-moulding tool that lies downstream of the insert part is filled last with the plastics material, and therefore the flow fronts of the plastics compound meet in this region and the weld line then forms in this region. By introducing an insert part into a particular partial region of the gate region, the location of the weld line in finished, for example cylindrical injection-moulded components can thus be changed without having to change the form and surface structure of the cavity of the injection-moulding tool. This has the advantage that the weld line can be displaced into a region of the finished component that can be strengthened without problems, in order to compensate the weakening owing to the weld line present. Furthermore, the device according to the invention can also be used to produce components with different positions of the weld line in a prototype phase, in order to determine which of these components is particularly stable and suitable for the respective application, and thus to develop a suitable injection-moulding tool for the series production of the component.

The insert part can have different forms and/or outer contours for this purpose. According to the invention, the insert part merely has to ensure that undisrupted flowing of the plastics material through the partial region of the gate region is prevented or impeded. In principle, it is thus sufficient that the insert part is configured in such a way that, in that portion of the partial region at which the plastics material enters the gate region, said insert part constitutes an obstacle which prevents or impedes the entry of the plastics material. In this portion of the partial region, said insert part can thus for example have a wall-like or screen-like structure, while the remaining constituent parts of the insert part serve to fix it in the partial region of the gate region.

According to a particularly advantageous embodiment of the device according to the invention, the form of the insert part is adapted to the form of the partial region of the gate region and at least partially fills the partial region. The insert part is thus preferably formed in such a way that it completely fills at least a certain portion of the partial region and thus blocks the passage of the plastics material through this portion. For example, the insert part can at least partially be a solid element which can be inserted in a form-fitting manner into the partial region of the gate region or a portion of the partial region. The insert part can, however, for example also be an at least partially hollow element, the surface of which is adapted to the form of the partial region of the gate region and thus can be inserted in a form-fitting manner into the partial region or a portion of the partial region.

In a further advantageous configuration of the invention, the insert part can be inserted into different partial regions of the gate region. The weld line can thus be displaced into a variety of and optionally any desired regions of the finished component. Furthermore, a variable insertion of the insert part into the gate region allows the positions of the weld line to be varied in a quick and simple manner, and therefore components with different positions of the weld seam can be checked on a test basis in order ultimately to develop a suitable injection-moulding tool for the series production of the component.

Advantageously, the insert part can be fastened for example by at least one fastening means in the gate region. This fastening means is preferably adapted to corresponding structures of the insert part and/or of one of the two mould halves. For example, the insert part can comprise the at least one fastening means, in this case the fastening means being fastened to a mould half (optionally in a separable manner). As an alternative or in addition, however, a mould half can also comprise the at least one fastening means, in this embodiment the insert part being fastened to the fastening means (optionally in a separable manner). The fastening means could also be a separate element which, at one end, has a configuration corresponding to a structure of a mould half in the form of an adapter and, at its opposite end, has a configuration corresponding to a structure of the insert part.

The insert part can be fastened releasably or non-releasably in the gate region. A releasable fastening is advantageous in particular whenever a variable insertion of the insert part into different partial regions of the gate region is necessary to vary positions of the weld line in a quick and simple manner. A non-releasable fastening of the insert part in the gate region can be advantageous in particular when a stable injection-moulding tool with a low susceptibility to faults is required for series production.

The device according to the invention can advantageously be used whenever the gate region is formed in the shape of a fan (fan gate), disc and/or plate (disc gate, ring gate) or film (film gate).

The device according to the invention is advantageously provided and/or particularly suitable for use in the production of cylinder housings, in particular cylinder housings for concentric slave cylinders (central release mechanisms and/or central actuators).

The object is achieved according to the invention also by an insert part according to claim 10. Advantageous configurations and expedient developments of the invention become apparent from dependent claims 11 and 12.

The insert part according to the invention is provided for at least partial insertion into a partial region of the gate region of an injection-moulding tool and is advantageously distinguished in that it prevents or at least impedes and/or delays flowing of the plastics material through the partial region. The insert part is thus formed in such a way that the region of the cavity of the injection-moulding tool that lies downstream of the insert part is filled last with the plastics material, and therefore the plastics compound converges in this region and the weld line forms in this region.

According to a particularly advantageous embodiment of the insert part according to the invention, its form is adapted to the form of the partial region of the gate region. The insert part can thus have different forms and/or outer contours depending on the form of the partial region. According to the invention, it merely has to be ensured that the insert part prevents or impedes flowing of the plastics material through the partial region of the gate region. In an advantageous configuration of the invention, the insert part can be configured for example in such a way that, in that portion of the partial region at which the plastics material enters the gate region and/or the cavity, said insert part constitutes an obstacle which prevents or impedes the entry of the plastics material. In this portion of the partial region, said insert part can for example have a wall-like or screen-like structure, while the remaining constituent parts of the insert part serve to fix it in the partial region of the gate region. The insert part can also be formed in such a way that it completely fills at least a certain portion of the partial region and thus blocks the passage of the plastics material through this portion. For example, the insert part can at least partially be a solid element which can be inserted in a form-fitting manner into the partial region of the gate region or a portion of the partial region. The insert part can, however, for example also be an at least partially hollow element, the surface of which is adapted to the form of the partial region of the gate region and thus can be inserted in a form-fitting manner into the partial region or a portion of the partial region. If the insert part is inserted into a fan gate of an injection-moulding tool, it can advantageously extend over a sector of the fan-shaped gate region that covers preferably an angle of between 20° and 160°, in particular an angle of between 60° and 120°, and particularly preferably an angle of between 80° and 100°.

In an advantageous configuration of the invention, the insert part can for example comprise at least one fastening means. This fastening means is preferably adapted to corresponding structures of the insert part and/or of one of the two mould halves and serves to fix the insert part in the gate region.

The method, in which two mould halves are pressed together releasably, wherein, in the pressed-together state, the two mould halves form at least one gate region and at least one common cavity for moulding the plastics material, and in which a plastics material is melted and/or liquefied by heating and subsequently introduced into the cavity via the gate region, is characterized according to the invention in that, before the two mould halves are pressed together, at least one insert part is inserted into the gate region in such a way that flowing of the plastics material through this partial region is prevented or at least impeded and/or delayed. The insertion of an insert part ("insert") into the gate region advantageously results in that region of the cavity which lies downstream of the insert part being filled last with the plastics material. Consequently, the location of the weld line in finished injection-moulded components can be changed without having to change the form and surface structure of the cavity of the injection-moulding tool. By means of the method according to the invention, the weld line can thus be displaced into any desired region of the finished component, for example a region that can be strengthened without problems, in order to compensate the weakening owing to the weld line present.

In an advantageous configuration of the method according to the invention, the insert part is fastened releasably in the gate region and, in the case of the production of at least two components, is inserted in each case into different partial regions of the gate region. The weld line can be displaced into different regions of the finished component by virtue of this procedure. In this way, by means of the method according to the invention, components with different positions of the weld line can be produced, in order to determine which of these components is particularly stable and suitable for the respective application, and how a suitable injection-moulding tool for the series production of the component should be configured.

The invention relates advantageously for example to a cylinder housing, in particular a cylinder housing for a concentric central actuator for a hydraulic or pneumatic clutch actuating means.

The invention described is not limited only to a concentric slave cylinder but can be applied to any type of plastic component in a vehicle transmission, such as hydraulic component, master cylinder, actuator, parking lock device, pump or electric pump, gear-shifter, valves, throttle, etc.

BRIEF DESCRIPTION OF THE DRAWINGS

Further advantages and features of the invention become apparent from the following description with regard to the exemplary embodiments illustrated in the drawings, in which.

DETAILED DESCRIPTION

For the purpose of simplification, identical elements are denoted by identical reference signs in the figures even in the case of different embodiments.

Figure 1:
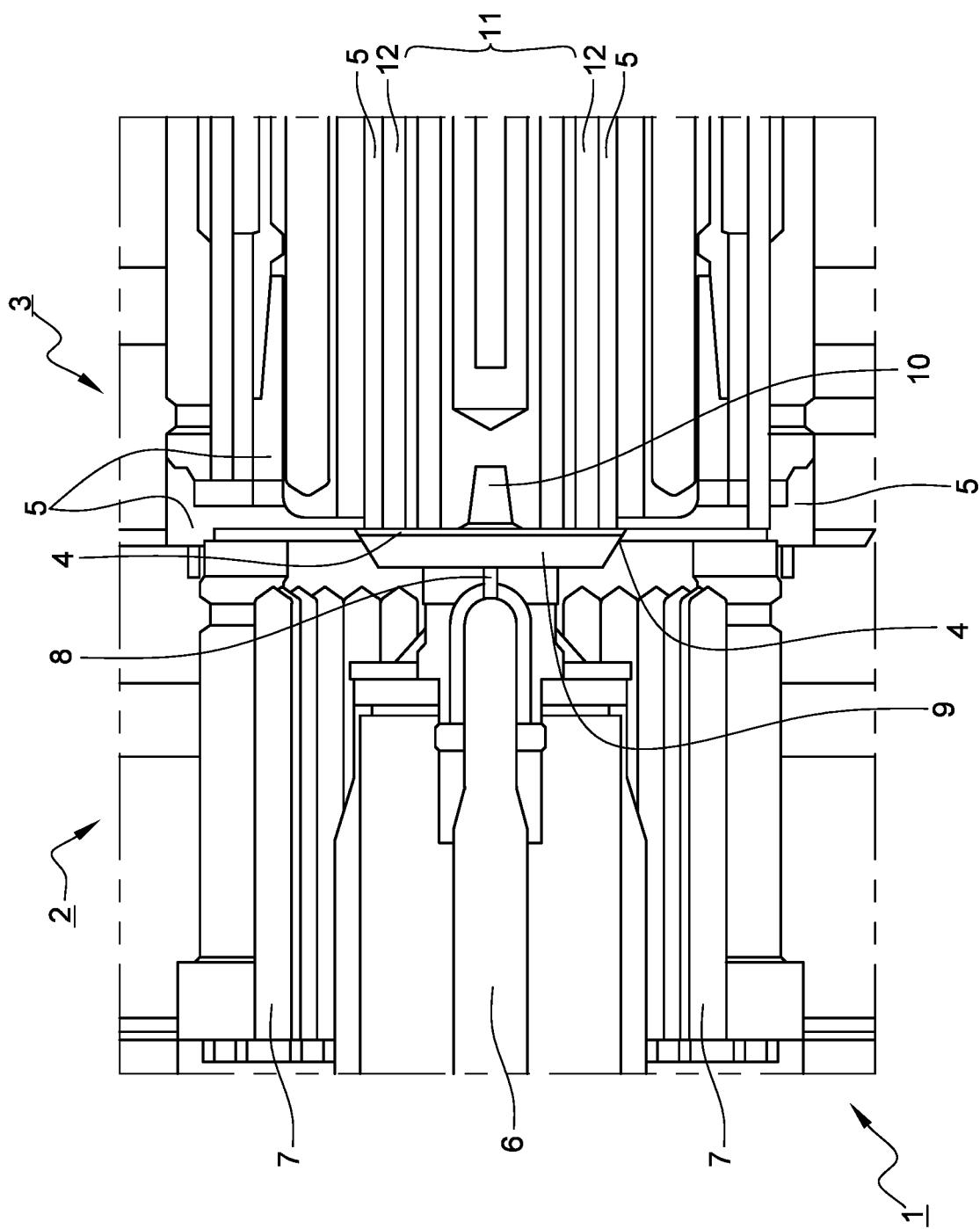
FIG. 1: shows a longitudinal section through a part of an exemplary embodiment of a device according to the invention.

FIG. 1 shows a longitudinal section through a part of an exemplary embodiment of a device 1 for producing a plastics component by means of injection moulding. The device 1, which can be in particular a part of an injection-moulding tool, comprises a first mould half 2 ("nozzle side", illustrated only partially here) and a second mould half 3 ("ejector side", likewise illustrated only partially here) which form the injection-moulding tool for moulding the plastics material. The two mould halves 2, 3 can be brought into contact by axially displacing one of the two mould halves 2, 3 or both mould halves 2, 3, the injection-moulding tool being closed by pressing together the two mould halves 2, 3. In the closed state, illustrated here, the two pressed-together mould halves 2, 3 enclose a gate region 4 and a common cavity 5, in which the component to be produced is formed. In the embodiment illustrated here, the gate system comprises an injection channel 6 for injecting the plastics material into the cavity 5, which is configured as a hot-runner variant. The injection unit of the injection-moulding machine presses a molten, fluid plastics material into the injection channel 6, which can be heated by a temperature controlling device 7 for controlling the temperature of the plastics material located in the injection channel 6. The fluid plastics material is injected out of the injection channel 6 into the gate region 4 via a nozzle 8, there firstly strikes a plate- and/or fan-shaped element 9 and then flows over said element into the cavity 5. On the "nozzle side", the fan-shaped element 9 forms an injection face and thus in practical terms constitutes a fan gate. On the "ejector side", the fan-shaped element 9 comprises a central extension 10 which can be pushed in a form-fitting manner into a corresponding depression in the second mould half 3. The second mould half 3 comprises a central cylinder 11 (see FIG. 2) which is surrounded by a free space 12. The second mould half 3 also has an ejector device (the ejectors of the ejector device are not visible here, since they are shortened in this embodiment), by means of which the moulded and hardened finished component can be ejected out of the injection-moulding tool at the end of the injection-moulding operation.

Figure 2:
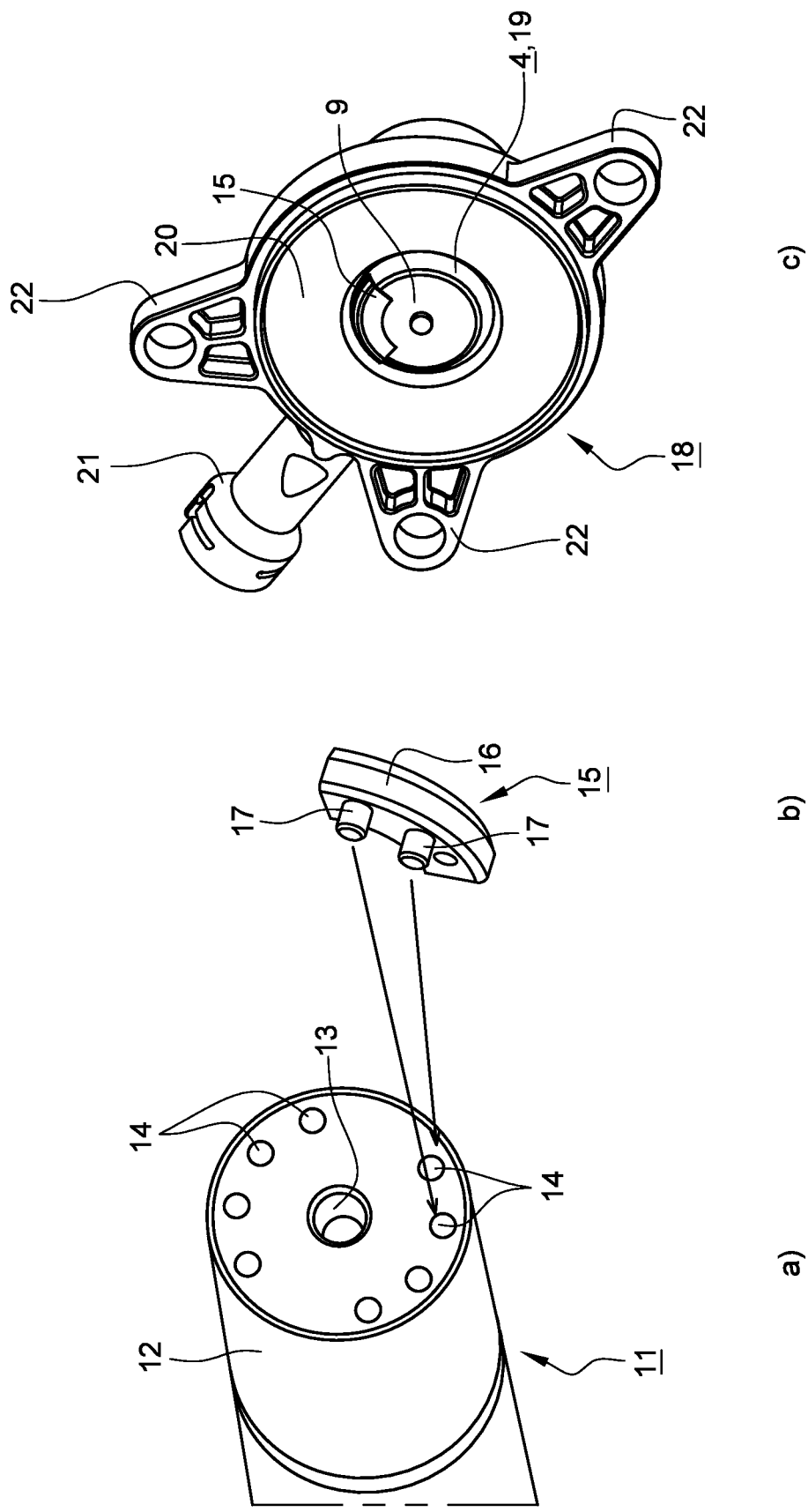
FIG. 2: a) shows a perspective view of a part of the second mould half ("ejector side") of the device according to FIG. 1, b) shows a perspective view of an exemplary embodiment of an insert part according to the invention, c) shows a perspective view of that side ("nozzle side") of a finished component which faces the first mould half according to FIG. 1, FIG. 3: a) shows a perspective view of a finished component with a weld line, and b) shows a perspective view of a further finished component with a weld line.

FIG. 2 a) shows the central cylinder 11, which is installed fixedly in the second mould half 3 of the device 1 according to FIG. 1. The central cylinder 11 comprises a central depression 13, into which the extension 10 of the fan-shaped element 9 according to FIG. 1 can be pushed, and eight cylindrical hollow spaces 14, in which the (shortened) ejectors are movably mounted.

FIG. 2 b) shows an exemplary embodiment of an insert part 15 according to the invention that consists of a base body 16, which is in the shape of a quarter of a circle and is provided with two pin-shaped fastening means 17. The fastening means 17 serve to fasten the insert part 15 to the central cylinder 11, the fastening means 17 corresponding to and being able to plugged into the hollow spaces 14 (see arrows). In this way, the insert part 15 can be fixed releasably in the gate region 4 of the device 1 according to FIG. 1, the fan-shaped element 9 according to FIG. 1 not being reproduced in this illustration.

This is made clear in FIG. 2 c), which shows that side ("nozzle side") of a finished component 18 which faces the first mould half 2 according to FIG. 1, the fan-shaped element 9, which forms the fan gate, and the insert part 15 fastened therein additionally also being reproduced in this illustration. The embodiment illustrated here is a test variant, in which, after ejecting the component 18 out of the injection-moulding tool, the fan-shaped element 9 and the insert part 15 remain initially in the component 18, and therefore said test variant still has to be removed therefrom for further use. It is thus made clear in this illustration that the insert part 15 is arranged within the gate region 4 of the device 1 according to FIG. 1, wherein said insert part initially prevents flowing of the molten plastics material into that portion of the gate region 4 which is located downstream of the insert part 15, since, on account of its location, said insert part blocks and/or delays flowing of the plastics material into the circular portion 19 of the gate region 4. Ultimately, the weld line which forms in the region in which the flow fronts of the plastics material meet can thus be displaced into another region of the component 18 (see FIG. 3).

The component 18 is a cylinder housing for a concentric central actuator (central release mechanism). The component 18 comprises an annular base body 20, onto which are moulded a pressure connector 21 and three flanges 22, which are provided to fasten the cylinder housing to for example a transmission housing of a motor vehicle. The pressure connector 21 is formed by means of a mould core which is placed into the injection-moulding tool and around which the plastic flows during the injection-moulding operation.

The pressure connector 21 is fluidically connected to the annular working space of the cylinder formed by the base body 20, and therefore a pressure medium can be admitted to the cylinder.

Figure 3:
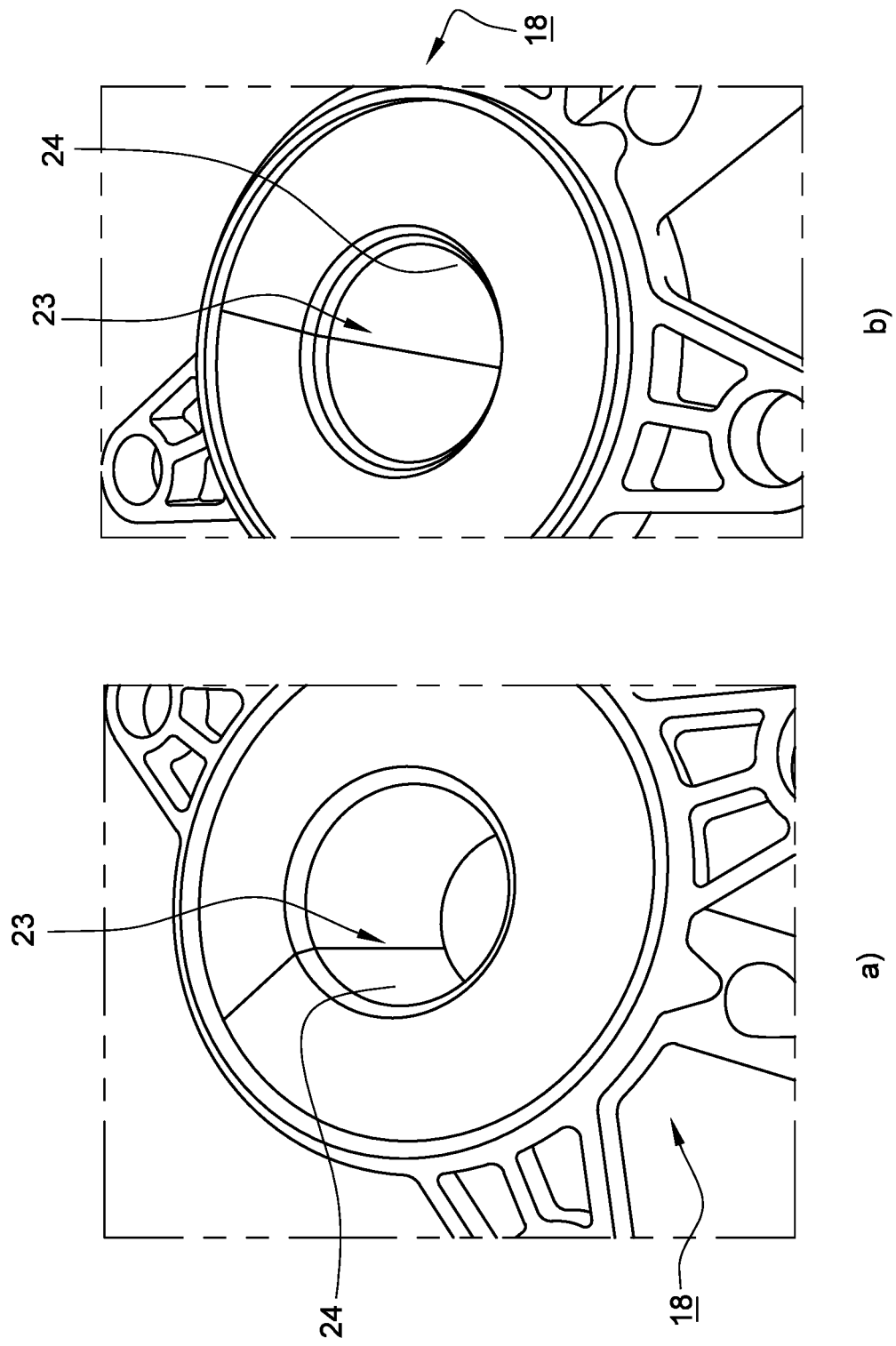

FIG. 3 a) shows that side ("nozzle side") of a finished component 18 which faces the first mould half 2 according to FIG. 1, in which the weld line 23 can be seen within the cylinder 24. The component 18 according to FIG. 3 a) has been produced by means of a conventional injection-moulding tool without an insert part. By contrast to this, the component 18 according to FIG. 3 b) has been produced by the method according to the invention and by means of a device according to the invention having an insert part. In this component 18, the weld line 23 is located at a different point than in the component 18 according to FIG. 3 a). FIG. 3 thus shows that the location of the weld line in finished injection-moulded components can be changed without having to change the form and surface structure of the cavity of the injection-moulding tool. The weld line can consequently be displaced into any desired other region of the finished component by means of the method according to the invention. In this way, by means of the method according to the invention, for example components with different positions of the weld line can be produced, in order to determine which of these components is particularly stable and suitable for the respective application, and how a suitable injection-moulding tool for the series production of the component should be configured.

LIST OF REFERENCE SIGNS

1 Device
2 Mould half
3 Mould half
4 Gate region
5 Cavity
6 Injection channel
7 Temperature controlling device
8 Nozzle
9 Fan-shaped element
10 Extension
11 Central cylinder
12 Free space
13 Depression
14 Hollow space
15 Insert part
16 Base body
17 Fastening means
18 Component
19 Circular portion
20 Base body
21 Flange
22 Pressure connector
23 Weld line
24 Cylinder

The invention claimed is:

1. A device for producing a component from a plastics material by injection moulding, the device comprising:
 two mould halves that can be pressed together releasably and, in a pressed-together state, form at least one gate region and at least one common cavity for moulding the plastics material, wherein the gate region is fluidically connected to the cavity to introduce the plastics material into said cavity,
 wherein at least one insert part is provided which is arranged at least partially in a partial region of the gate region, and
 wherein the insert part is formed to prevent or at least to impede flowing of the plastics material through the partial region such that a region of the cavity that is directly adjacent to the insert part is a last part of the cavity to be filled with the plastics material and therefore flow fronts of the plastics material meet in the region of the cavity to form a weld line in the region of the cavity directly adjacent to the insert part.

2. The device according to claim 1, wherein the form of the insert part is adapted to the form of the partial region of the gate region and at least partially fills the partial region.

3. The device according to claim 1, wherein the insert part is configured to be inserted into different partial regions of the gate region.

4. The device according to claim 1, wherein the insert part is fastened by at least one fastening means in the gate region.

5. The device according to claim 4, wherein the insert part comprises the at least one fastening means and the fastening means is fastened to a mould half.

6. The device according to claim 4, wherein a mould half comprises the at least one fastening means and the insert part is fastened to the fastening means.

7. The device according to claim 1, wherein the insert part is fastened releasably or non-releasably in the gate region.

8. The device according to claim 1, wherein the gate region is formed in the shape of a fan, disc and/or plate, or film.

9. The device according to claim 1, wherein the device is used in the production of cylinder housings.

10. The device according to claim 1, wherein the device is used in the production of cylinder housings for concentric slave cylinders.

11. A method for producing a component by injection moulding, comprising:
 pressing two mould halves together releasably, wherein, in the pressed-together state, the two mould halves form at least one gate region and at least one common cavity for moulding the plastics material; and
 liquefying a plastics material by heating and subsequently introducing the plastics materail into the cavity via the gate region,
 wherein, before the two mould halves are pressed together, at least one insert part is inserted into the gate region in such a way that flowing of the plastics material through the partial region is prevented or at least impeded such that a region of the cavity that is directly adjacent to the insert part is a last part of the cavity to be filled with the plastics material and therefore flow fronts of the plastics material meet in the region of the cavity to form a weld line in the region of the cavity directly adjacent to the insert part.

12. The method according to claim 11, wherein the insert part is fastened releasably in the gate region and, in the case of the production of at least two components, is inserted in each case into different partial regions of the gate region.

13. The device according to claim 1, wherein one of the two mould halves includes an injection channel and a nozzle, the plastics material being injected out of the nozzle and into the cavity, wherein the insert part is positioned downstream of the nozzle.

* * * * *